United States Patent [19]

Sussmeier

[11] Patent Number: 5,760,829
[45] Date of Patent: Jun. 2, 1998

US005760829A

[54] METHOD AND APPARATUS FOR EVALUATING AN IMAGING DEVICE

[75] Inventor: John W. Sussmeier, Wappingers Falls, N.Y.

[73] Assignee: United Parcel Service of America, Inc., Atlanta, Ga.

[21] Appl. No.: 465,677

[22] Filed: Jun. 6, 1995

[51] Int. Cl.⁶ ........................................................... H04N 17/00
[52] U.S. Cl. .......................... 348/187; 348/188; 348/126; 382/145
[58] Field of Search .................... 348/180, 187, 188, 184, 185, 86, 92, 125, 126, 131; 382/141, 144, 145, 149, 151; H04N 9/73, 17/00, 17/02

[56] References Cited

U.S. PATENT DOCUMENTS

| | | | |
|---|---|---|---|
| 4,170,025 | 10/1979 | Benkley et al. | 358/139 |
| 4,513,318 | 4/1985 | Wilensky et al. | 358/139 |
| 4,513,319 | 4/1985 | Breimer et al. | 348/188 |
| 4,575,124 | 3/1986 | Morrison | 348/188 |
| 4,760,447 | 7/1988 | Koka et al. | 358/139 |
| 4,761,685 | 8/1988 | Asaida et al. | 358/139 |
| 4,951,141 | 8/1990 | Fischer | 348/188 |
| 4,991,007 | 2/1991 | Corley | 348/187 |
| 5,140,418 | 8/1992 | Rivamonte | 358/139 |
| 5,221,834 | 6/1993 | Lisson et al. | 250/201 |
| 5,267,038 | 11/1993 | Fister | 358/139 |
| 5,327,226 | 7/1994 | Tanabe | 348/188 |
| 5,351,201 | 9/1994 | Harshbarger, Jr. et al. | 364/551.01 |
| 5,371,538 | 12/1994 | Widger | 348/188 |

OTHER PUBLICATIONS

Edmund Scientific 1995 Annual Reference Catalog for Optics, Science and Education, p. 92.

"The Design of Optical Systems", *Modern Optical Engineering*, 2d Ed., 1990, pp. 348–361 and 444–447.

*Primary Examiner*—Michael H. Lee
*Attorney, Agent, or Firm*—Jones & Askew

[57] ABSTRACT

A system and method allows a user to evaluate the critical optical parameters associated with an imaging device including a CCD array. The system includes a series of optical test targets. Digital images of the optical test targets are captured by the imaging device under test. The stored digital image data is automatically analyzed by a computer program which evaluates the dynamic range, contrast resolution and distortion of the imaging device. The results are compared to predetermined criteria and printed for evaluation by a user. The system provides a means for comparing and qualifying various camera systems to be used for package tracking.

11 Claims, 6 Drawing Sheets

(GENERAL TEST FLOW)

FIG. 6
(DYNAMIC RANGE TEST)

FIG. 7
(CONTRAST RESOLUTION TEST)

FIG. 8
(DISTORTION TEST)

METHOD AND APPARATUS FOR EVALUATING AN IMAGING DEVICE

TECHNICAL FIELD

The present invention relates to the evaluation of imaging devices, and more particularly relates to systems and methods for evaluating the optical parameters of imaging devices that include charge coupled device (CCD) area sensors and associated optics.

BACKGROUND OF THE INVENTION

Small package delivery companies such as the assignee of the present invention increasingly rely on machine readable codes for identifying packages. This has led to the development of imaging technologies for reading both one and two dimensional symbologies that are used to automatically track and sort packages. To accurately and efficiently track packages, delivery personnel must be provided with portable devices that are capable of capturing and storing images of package labels.

Imaging devices based on charge coupled device (CCD) area sensors have quickly become the technology of choice for capturing images of package labels. This is due primarily to their high performance and low cost. CCD area sensors are also well suited for use in portable image capturing devices used by delivery personnel.

When developing or purchasing imaging devices for reading machine readable symbologies, it is essential that the imaging device be capable of accurately resolving the small printed elements that make up the symbology. Thus, the optical parameters of the imaging device must be sufficient to ensure that standard symbologies can be accurately read and decoded at standard working distances.

Because this technology is relatively new, there is a lack of art in the industry for measuring the performance of CCD area sensor optical systems. Therefore, there is a need in the art for means for evaluating optical parameters in order to guarantee acceptable label reading performance in the field. There is also a need for methods and apparatus for comparing and qualifying various CCD camera systems to be used in the package transportation industry.

SUMMARY OF THE INVENTION

The present invention satisfies this need by providing methods and apparatus for measuring the critical optical parameters of a CCD area sensor imaging system. The present invention provides a series of optical test targets and methods for evaluating images of those targets. Digital images of the optical test targets are captured using the CCD optical system under investigation. The digital image data is used to assess various optical parameters. The invention provides a means for comparing the qualifying various camera systems to be used for package tracking or other purposes.

Generally described, the present invention provides a test system and a method for automatically evaluating an imaging device. In addition to the imaging device under test, the test system includes a plurality of test targets and a computer. The method includes retrieving a plurality of target images that correspond to the plurality of test targets and analyzing the target images to assess an optical characteristic of the imaging device. The results of the analysis are compared to predetermined criteria and the results of the test are provided as output.

In another aspect, the present invention provides a method for automatically evaluating a plurality of characteristics of an electronic imaging device. The method includes retrieving a first and second plurality of images captured by the imaging device under test. The first and second plurality of images are analyzed to evaluate first and second characteristics of the imaging device, respectively. The results of the analyses are provided as output data.

In yet another aspect, the present invention provides a system for automatically evaluating performance characteristics of an imaging device. The system includes a plurality of optical targets, which include features designed to test the performance characteristics of the imaging device. A test fixture is used to mount the test targets and the imaging device in a predetermined relationship. A computing device stores and evaluates test target images captured by the imaging device and corresponding to the plurality of test targets. An illumination light source establishes ambient lighting conditions. The computing device is programmed to retrieve and analyze the test target images in order to determine various optical characteristics of the imaging device. The computer compares the results of the analysis to a plurality of predetermined criteria and displays the results of the comparison.

It is therefore an object of the present invention to provide a method for evaluating and qualifying imaging devices.

It is another object of the present invention to provide methods and apparatus for measuring the critical optical parameters of a CCD area sensor imaging system.

It is another object of the present invention to provide a series of optical test targets and a method for evaluating images of those targets.

It is another object of the present invention to provide a system for comparing the qualifying various camera systems to be used for package tracking or other purposes.

DETAILED DESCRIPTION OF THE PREFERRED EMBODIMENT

Turning first to the nomenclature of the specification, the detailed description which follows is represented largely in terms of processes and symbolic representations of operations performed by conventional computer components, including a central processing unit (CPU), memory storage devices for the CPU, and connected display devices. These operations include the manipulation of data bits by the CPU and the maintenance of these bits within data structures resident in one or more of the memory storage devices. The symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user that interacts with the computer. The machines used for performing the operation of the present invention include general purpose digital computers or other similar computing devices.

In addition, it should be understood that no particular programming language is provided, and that the programs, processes, methods, etc. described herein are not limited to any particular computer or apparatus. Those skilled in the art will appreciate that there are many computers and operating systems which may be used in practicing the instant invention and therefore no detailed computer program could be provided which would be applicable to these many different systems. Each user of a particular computer or operating system will be aware of the program modules and tools that are most appropriate for that user's needs and purposes.

Referring now the drawings, in which like numerals represent like elements throughout the several figures, the present invention and the preferred operating environment will be described.

The Operating Environment

Figure 1:
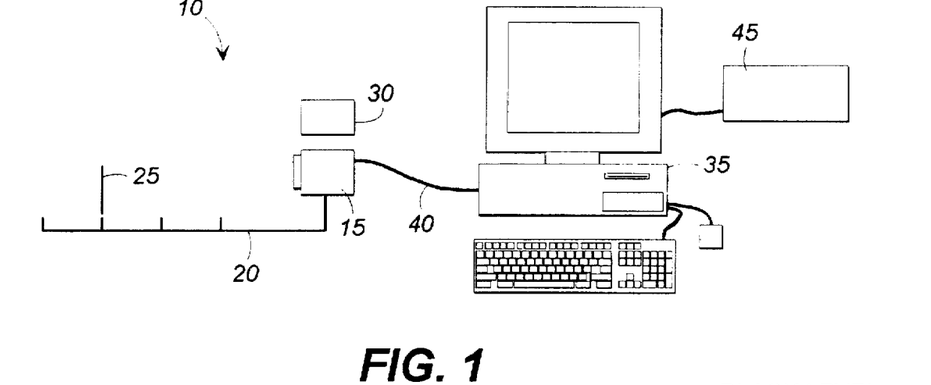
FIG. 1 is a schematic representation of the preferred test system, which includes an imaging device, a test fixture, and a computer.

FIG. 1 illustrates the preferred test system 10, which is used to evaluate the critical optical parameters of a CCD imaging device. The test system 10 includes an imaging device 15 under test, a test fixture 20, a test target 25, an external illumination source 30, and a computer 35. The imaging device 15 is connected to the computer 35 by a cable 40. The computer 35 is also connected to a printer 45, which is used to print the results of the evaluation.

Generally described, the test system is used to evaluate the performance of imaging devices that are suitable for reading package labels and the like. The imaging device 15 under test is used to capture images of a variety of test targets, which are discussed in conjunction with FIGS. 2–4. These digital images are analyzed by a computer program running on the computer 35 in order to assess various optical parameters and determine whether the imaging device satisfies the required performance criteria.

The preferred test system 10 is designed to evaluate imaging devices such as the sensor that is described in detail in copending U.S. Pat. Application Ser. No. 08/328,660, filed Oct. 25, 1994, and entitled Automatic Electronic Camera For Label Image Capture, the disclosure of which is incorporated herein by reference.

The preferred imaging device 15 includes a type ICX059AL image sensor, manufactured by Sony. The preferred imaging device 15 is a CCIR format CCD camera with a ½ inch CCD array. The imaging device provides a 752×291 effective pixel resolution in field mode. The imaging device also includes a lens assembly having a focal length of 5 mm, which is used to form an image on the CCD array. This provides a relatively wide field of view that measures approximately 53° horizontal (H) by 41° vertical (V). The size of the image that is formed on the CCD array is 4.89 mm (H) by 3.64 mm (V). The object distance for ideal focus is 149 mm. The field of view at the ideal focus distance (149 mm) is 141 mm (H) by 105 mm (V) (5.54"× 4.13"). The depth of field is ±50 mm around the ideal focus. The imaging device 15 also includes a built-in illumination source that allows an image to be captured regardless of the ambient lighting conditions.

In the test system 10, the external illumination source 30 allows the user to simulate various types of ambient lighting conditions, such as typical office lighting and direct sunlight. Those skilled in the art will appreciate that an imaging device must operate reliably in various types of lighting conditions in order to allow delivery personnel in the field to capture images of package labels when packages are picked up and delivered. Therefore, the test system 10 facilitates the evaluation of imaging devices under a variety of lighting conditions.

The test fixture 20 is used to mount the imaging device 15 and test target 25 at various predetermined object distances, and to ensure that the center of the test target is aligned with the optical axis of the imaging device. In the preferred test system 10, the test fixture is constructed so that the test targets may be mounted at object distances of 100 mm, 150 mm, and 200 mm.

Those skilled in the art will appreciate that the particular object distances, target size, target features, etc. used in the test system are determined according by the specifications of the imaging device being tested and the required performance parameters.

The computer 35 is an IBM-compatible personal computer. Those skilled in the art will understand that the computer includes the standard storage and input/output devices, such as a hard drive, floppy drive, display, keyboard, and mouse. The computer 35 also includes a frame grabber board and associated software. The frame grabber board is connected to the imaging device 15 by cable 40. The analog video data from the imaging device is digitized by the frame grabber board and stored in the computer's memory or on the hard drive. The software associated with the frame grabber board and the connections between the imaging device and the frame grabber board allow the user to control the camera and capture images of test targets via the computer.

The Preferred Method for Evaluating the Imaging Device

Figure 2:
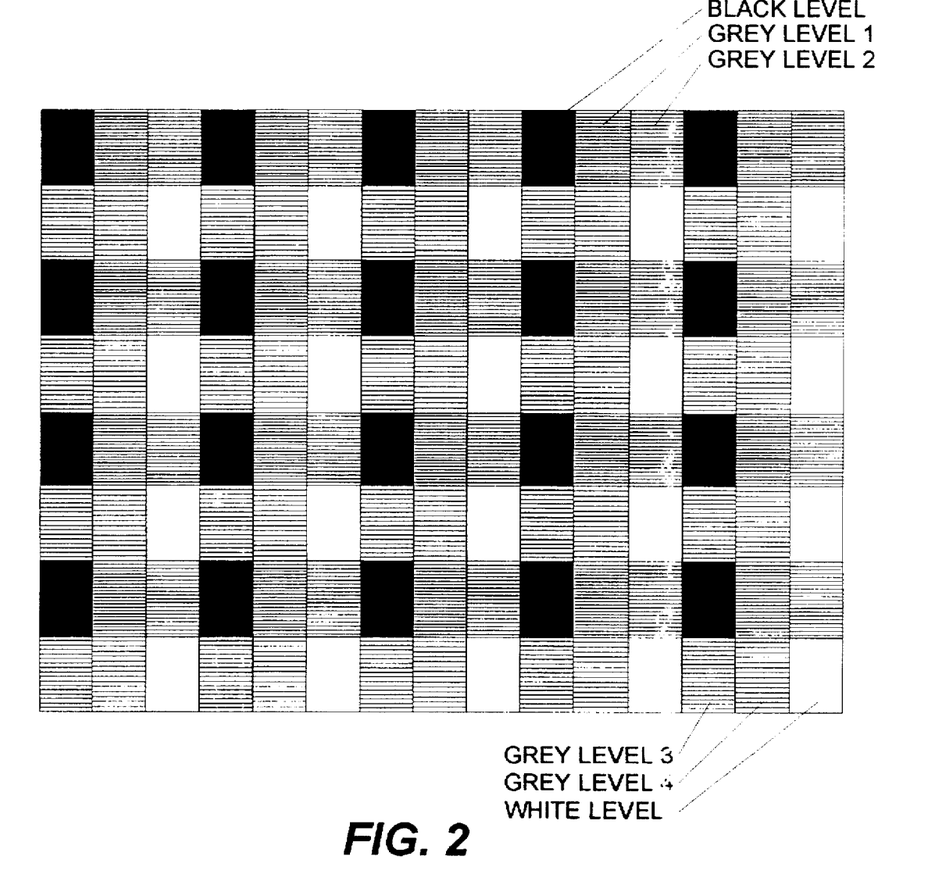
FIG. 2 illustrates a test target used in the test system of FIG. 1 to determine the dynamic range of the imaging device.
Figure 3:
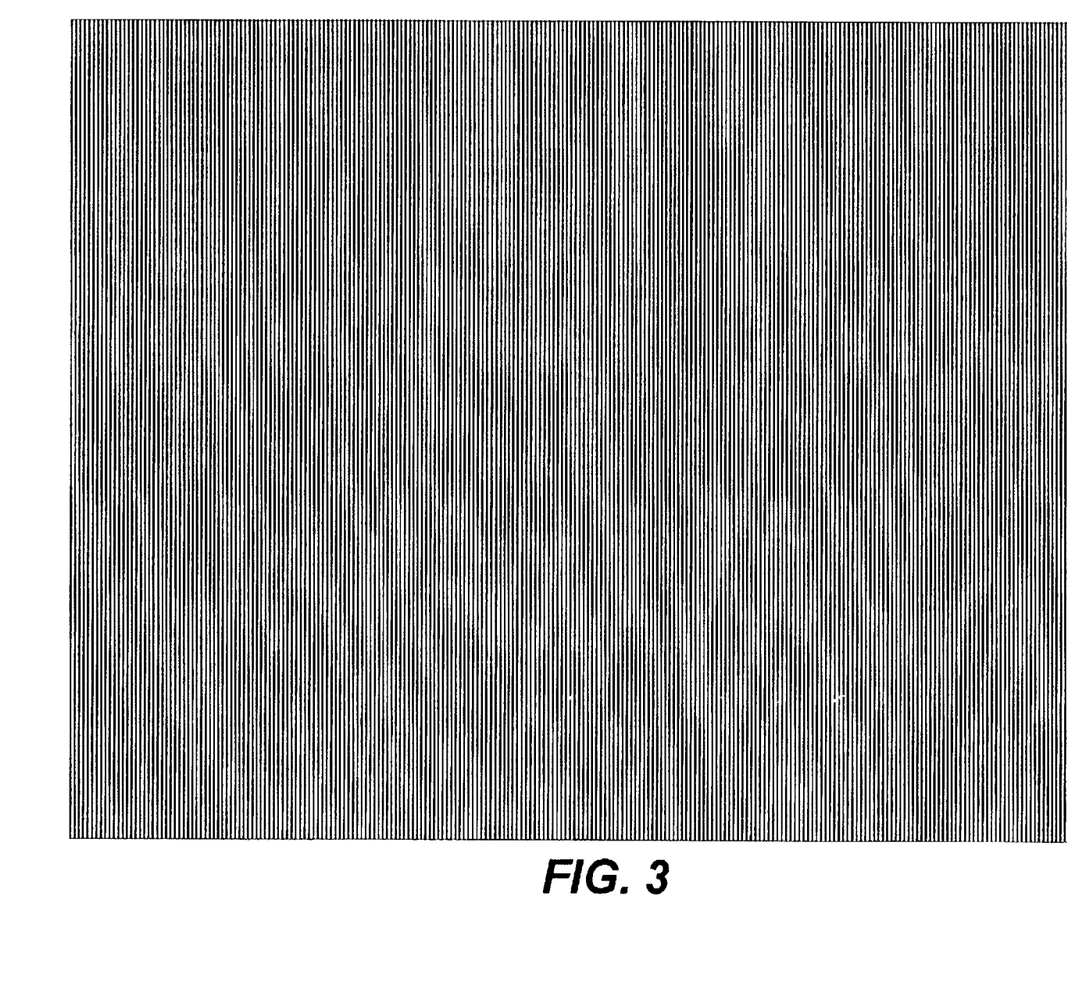
FIG. 3 illustrates a test target used in the test system of FIG. 1 to determine the horizontal contrast resolution and distortion of the imaging device.
Figure 4:
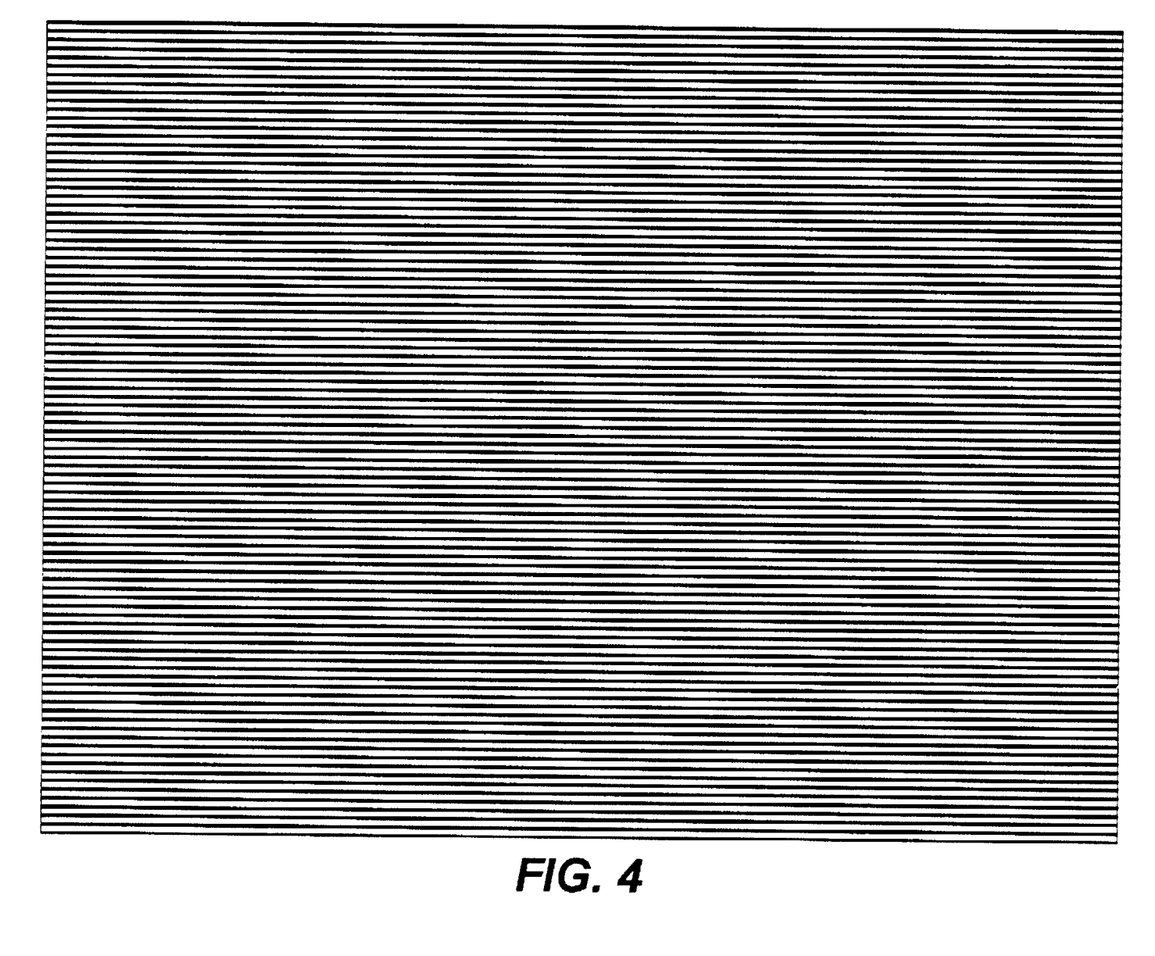
FIG. 4 illustrates a test target used in the test system of FIG. 1 to determine the vertical contrast resolution and distortion of the imaging device.
Figure 5:
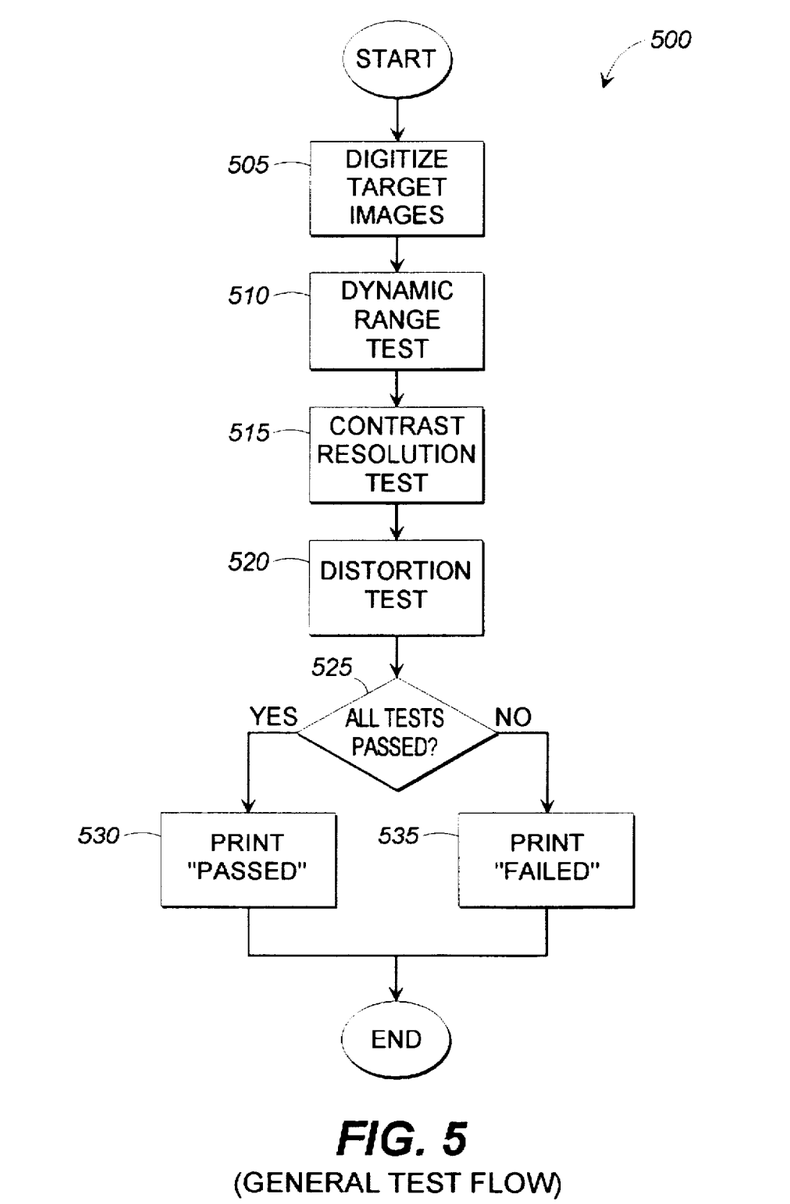
FIG. 5 is a flow diagram illustrating the test sequence performed by the test system of FIG. 1.
Figure 6:
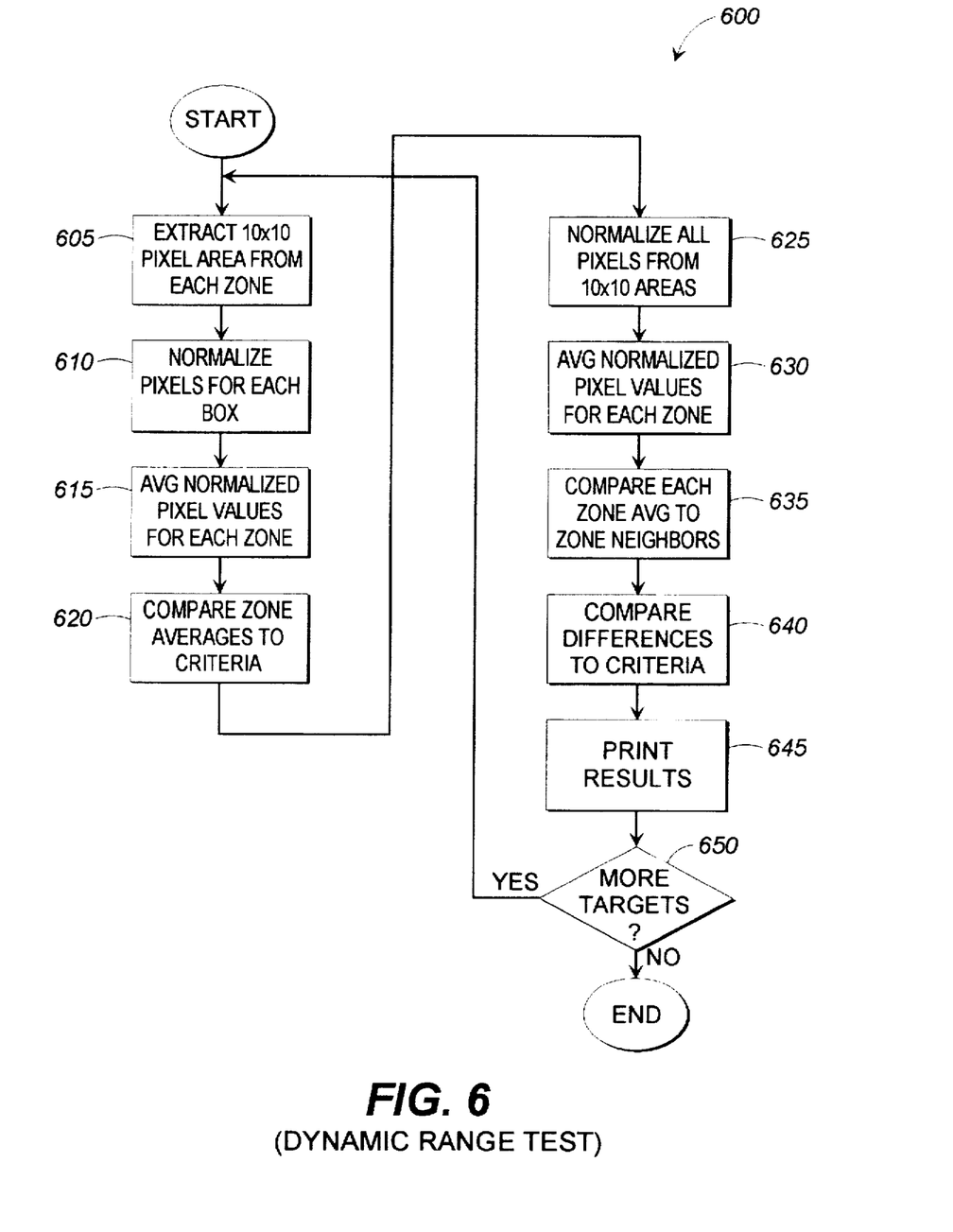
FIG. 6 is a flow diagram illustrating the dynamic range test performed as part of the test sequence of FIG. 5.
Figures 7, 8:
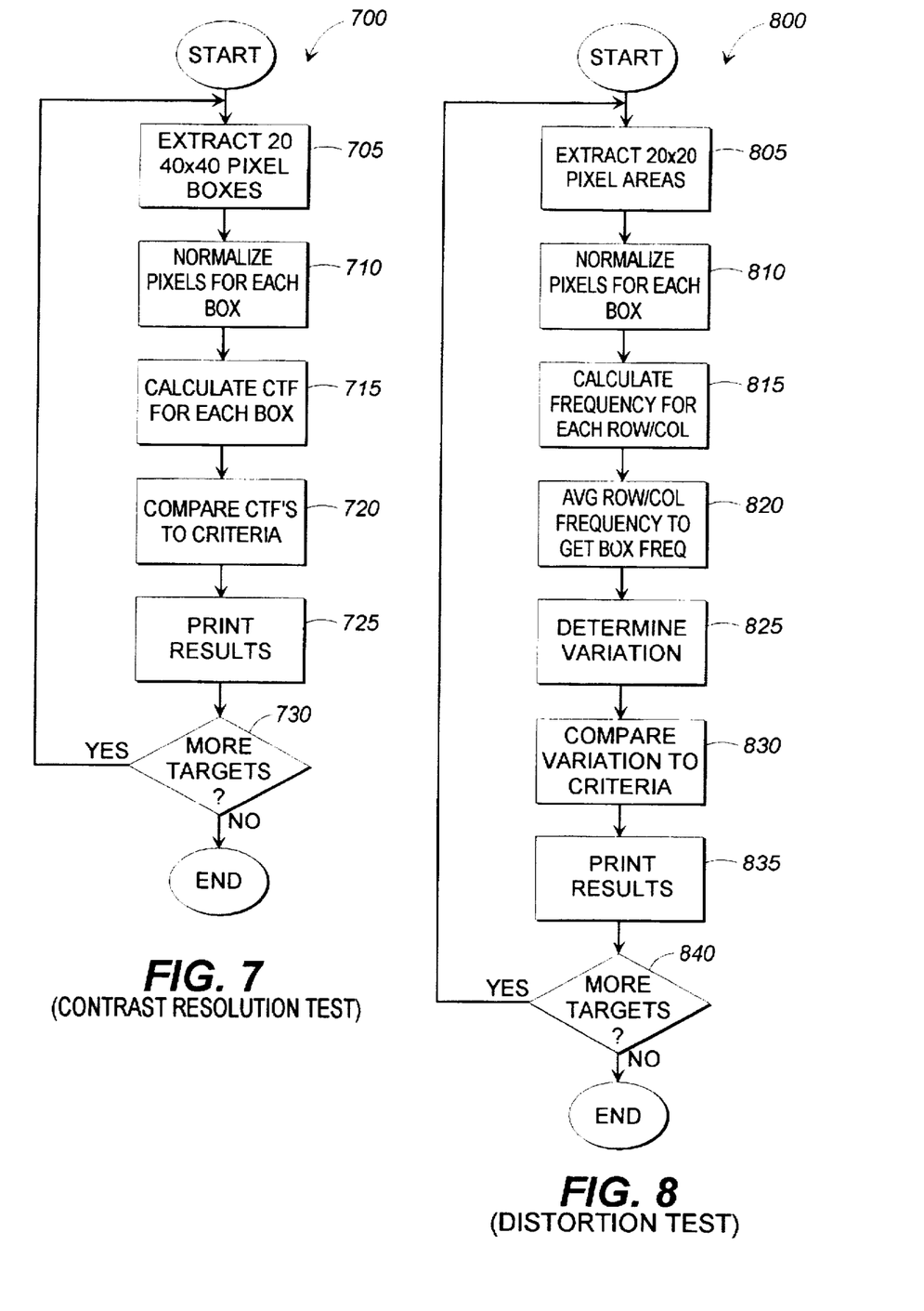
FIG. 7 is a flow diagram illustrating the contrast resolution test performed as part of the test sequence of FIG. 5.
FIG. 8 is a flow diagram illustrating the distortion test performed as part of the test sequence of FIG. 5.

Turning now to FIGS. 2–8, the preferred test targets and methods for measuring the critical optical parameters of the imaging device 15 will be described. FIG. 2 illustrates the preferred test target for determining the dynamic range of the imaging device. FIG. 3 illustrates the preferred test target for determining the horizontal contrast resolution and distortion of the imaging device. FIG. 4 illustrates the preferred test target for determining the vertical contrast resolution and distortion of the imaging device. FIG. 5 is a flow diagram illustrating the test sequence performed by the test system of FIG. 1. FIG. 6 is a flow diagram illustrating the dynamic range test that forms a part of the test sequence of FIG. 5. FIG. 7 is a flow diagram illustrating the contrast resolution test that forms a part of the test sequence of FIG. 5. FIG. 8 is a flow diagram illustrating the distortion test that forms a part of the test sequence of FIG. 5.

As described above, the present invention provides a system and methods for measuring critical optical parameters of a CCD area sensor imaging device. In the system of FIG. 1, the CCD area sensor imaging device includes a CCD area sensor, a lens, a built-in illumination means, and supporting electronics and hardware. The present invention includes a plurality of optical test targets and methods for evaluating images of the test targets. Digital images of the optical test targets are produced using the imaging device under investigation. The images are captured at predetermined object distances and under various lighting conditions. The digital image data is stored on the computer on evaluated using the methods of the present invention, which calculate various optical parameters. The optical parameters that are evaluated in the preferred system include the dynamic range, contrast resolution, and distortion. Adequate performance in all of these areas is essential to ensure that the imaging device under test will perform satisfactorily when used to read actual package labels.

The Preferred Test Targets

FIGS. 2–4 illustrate the test targets that are used in the present invention. In order for the evaluation to accurately reflect the performance of the imaging device, the test targets must be fabricated to acceptable standards. Generally, the diffuse optical reflectance values of the targets are measured with a densitometer having secondary traceability to NIST (National Institute of Standards and Technology). For all wavelengths between 400 to 700 NM in the visible spectrum, the black areas of the targets have a reflectance of 6.0±4% and the white areas of the targets have a reflectance of 86.0±4%. Reflectance values for gray shaded areas are between black and white values and also have a tolerance of ±4%. It follows that minimum print contrast, (White-Black)/White, is:

((86−4)−(6+4))/(86−4)=0.88

FIG. 2 illustrates the targets that are used to measure the dynamic range of the imaging device under test. In the preferred system, a separate test target is provided for use at each of three object distances. All three test targets include twenty equal sized regions that are arranged in a two dimensional array. Each region contains six equal sized zones having different gray scale values. The zones range from pure black to pure white with four equally spaced gray scale values in between.

Those skilled in the art will understand that the mechanical drawing of FIG. 2 is intended to indicate the relative size and position of the regions and zones, and does not accurately depict the appearance of the intermediate gray levels. Similarly, the array of regions that make up the test target may be regular or irregular in their arrangement.

Based on the values described above, the diffuse optical reflectance for each gray value is as follows:

| Gray Level | Reflectance |
|---|---|
| Black Level | 6 +/− 4% |
| Gray Level #1 | 22 +/− 4% |
| Gray Level #2 | 38 +/− 4% |
| Gray Level #3 | 54 +/− 4% |
| Gray Level #4 | 70 +/− 4% |
| White Level | 86 +/− 4% |

In the preferred system, three different sized targets are used to measure the dynamic range. The size of each test target is such that the overall dimensions of the test target coincide with the imaging device's field of view at the required object distance. The field of view and object distance for each of the three test targets are as follows:

| Field of View | Object Distance |
|---|---|
| 94 mm × 71 mm | 100 mm |
| 141 mm × 106 mm | 150 mm |
| 188 mm × 141 mm | 200 mm |

FIGS. 3 and 4 illustrate the test targets that are used to measure the contrast resolution and distortion of the imaging device under test. The test target of FIG. 3 is used to evaluate contrast resolution and distortion in the horizontal direction. The test target of FIG. 4 is used to evaluate contrast resolution and distortion in the vertical direction.

The width of the black bars and the spacing between them are equal and correspond to the minimum feature size that the preferred imaging device is expected to resolve. The feature size is 0.015 inches in the horizontal direction (vertical bars on the test target of FIG. 3) and 0.030 inches in the vertical direction (horizontal bars on the test target of FIG. 4). Both test targets measure 188 mm×141 mm.

The Preferred Evaluation Methods

FIG. 5 is a flow diagram illustrating the general test sequence of the preferred evaluation method 500. The first step 505 requires a user to digitize and store images of the appropriate test targets. Generally described, this requires the user to place each of the required test targets in the correct position in the test fixture, establish the required ambient lighting conditions, and capture the images of the test target. The specific test targets, object distances and lighting conditions required for each test are discussed below in conjunction with FIGS. 6–8. After the digitized target images are stored in the computer, the method proceeds to step 510.

At step 510 the method performs the dynamic range test using the stored images corresponding to the target of FIG. 2. The specifics of the dynamic range test are discussed below in conjunction with FIG. 6. Once the dynamic range test is complete, the computer prints the test values associated with the test.

At step 515 the method performs the contrast resolution test using the stored images corresponding to the targets of FIGS. 3 and 4. The specifics of the contrast resolution test are discussed below in conjunction with FIG. 7. After the contrast resolution test is complete, the computer prints the test values associated with the test.

At step 520 the method performs the distortion test using the stored images corresponding to the targets of FIGS. 3 and 4. The specifics of the distortion test are discussed below in conjunction with FIG. 8. After the distortion test is complete, the computer prints the test values associated with the test.

At step 525 the method determines whether the imaging device under test passed the dynamic range, contrast resolution and distortion tests (based on criteria described below). If all of the tests were passed, the computer displays and prints a message indicating that the imaging device under test is satisfactory (step 530). If the imaging device failed any of the tests, the computer displays and prints a message indicated that the imaging device under test failed (step 535).

The preferred system is described in terms of a method that stores all images and then sequentially performs all of the tests. However, those skilled in the art will understand that the process of digitizing and storing the required images and performing the tests may be accomplished in any number of different ways.

The images may be captured and stored under the control of the computer program that embodies the evaluation methods of the present invention. In this case, the computer program's user interface may instruct the user regarding which test target is needed, where it is to be positioned, and the ambient lighting conditions that are required. In this case, the computer program would control the identification of each of the stored image files. Alternatively, the user may digitize and store the images prior to invoking the computer program that performs the evaluation of the imaging device. In this case, the images may be captured using software provided with the frame grabber board. One the images are stored, the user would invoke the required computer program and identify the required images.

Likewise, the results of the tests may be displayed and/or printed at various times. For example, the computer program may print all of the values associated with each test regardless of whether the imaging device passes or fails the test. At the end, the values associated with failed tests may be reprinted along with the "failed" message. Those skilled in the art will appreciate the particular user interface and the method for reporting test data to the user may be altered according to the needs or preferences of the user, and without departing from the scope of the present invention.

FIG. 6 is a flow diagram illustrating the method 600 for evaluating the dynamic range of the imaging device under test. In addition to evaluating the imaging device's dynamic range, this test also determines whether adequate gray value linearity exists between black and white. The dynamic range test includes two parts. The first part examines local performance. The second part examines the gray value variation over the entire image.

In the preferred system, the user digitizes and stores nine (9) images prior to initiating the dynamic range test. These images correspond to the three targets (at their respective object distances) under three ambient lighting conditions. The ambient lighting conditions are:

1. 0 foot-candles (total darkness)
2. 50–100 foot-candles (typical fluorescent office environment)
3. 9,500–10,000 foot-candles (typical sun at high noon, clear sky)

The use of a solar simulator is recommended for the 10,000 foot-candle source. The spectral output of this source should simulate solar radiation received at the Earth's surface after passing through an optical thickness of one standard atmosphere. Spectral distribution from sources other than a solar simulator, such as a tungsten lamp, should be evaluated to ensure that they produce satisfactory results.

The intensity of the ambient illumination is to be measured with an illuminance meter with a half power acceptance angle of at least 50 degrees. The ideal value is 60 degrees (cos 60=0.50) from the normal. The illumination detector is to be placed at the center of the test target and pointed in a direction normal to the object plane. Illumination measurements are to be made with the imaging device in the same position it will be in when digitizing target images.

The dynamic range portion of the method 600 begins at step 605, where a 10×10 pixel area is extracted from the center of each of the 120 zones on the test target. As described above in conjunction with FIG. 2, the preferred targets include 20 rectangular regions arranged in a two dimensional array. Each region is divided into six (6) zones having different gray scale values.

At step 610 the 600 extract pixels associated with each region (which each include 6 zones) are normalized using the following formula:

$$\text{Normalized Pixel Value} = \frac{\text{RAW} - \text{MIN}}{\text{MAX} - \text{MIN}}$$

where:
RAW=raw pixel value
MIN=minimum pixel value in the region
MAX=maximum pixel value in the region At step 615 the method determines the average of the 100 normalized pixel values for each zone.

At step 620 the average normalized pixel value for each zone is compared to the permissible average normalized pixel value for that zone. The permissible averages for each zone (120 zones total) are as follows:

| | |
|---|---|
| Pure Black: | 0.00 < AVG < 0.17 |
| Gray Level 1: | 0.17 < AVG < 0.33 |
| Gray Level 2: | 0.33 < AVG < 0.50 |
| Gray Level 3: | 0.50 < AVG < 0.67 |
| Gray Level 4: | 0.67 < AVG < 0.83 |
| Pure White: | 0.83 < AVG < 1.00 |

At step 625 the method 600 begins the process of evaluating the gray value linearity between black and white across the entire image. At step 625 the same 10×10 pixel areas that were extracted at step 605 for each of the six zones from each of the 20 regions are used again in this section. This time, however, all of the 12,000 pixels (10×10×6×20) are normalized together and the MAX and MIN values correspond to the maximum and minimum pixel values in the entire field of 12,000 pixels.

At step 630 an average pixel value is calculated for each zone in each region.

At step 635 the average pixel value for each zone is compared to the average pixel values for the surrounding respective zone neighbors. In other words, the average value of a particular gray level zone in a region is compared to the average values of the same gray level zone in the adjacent regions. This is accomplished by comparing each zone averages for the six most centrally located regions on the target with the eight respective surrounding zone neighbors.

At step 640 the differences between neighboring zones are compared the predetermined criteria. In the preferred system, the differences in neighboring zone values may not exceed 12 percentage points. For example, if a particular region has a Gray Level 1 value of 0.25 and all eight of its Gray Level 1 neighbors have values between 0.13 and 0.37, this is considered satisfactory.

At step 645 the method 600 causes the computer to print the results of the dynamic range test. In the preferred system, the printed information includes the average normalized pixel values for each region and the differences between zone neighbors.

At step 650 the method 600 determines whether additional target images need to be evaluated under the dynamic range test. As mentioned above, nine (9) images are used in the preferred system. Therefore, the method will return to step 605 and evaluate the next image until all nine images have been processed. At that point, the method 600 terminates and returns to the method 500 (FIG. 5).

FIG. 7 is a flow diagram illustrating the method 700 for evaluating the contrast of the imaging device under test. In the preferred system, the user digitizes and stores six (6) images prior to initiating the contrast resolution test. These images correspond to the two targets (horizontal and vertical; FIGS. 3 and 4, respectively) at three object distances (100, 150, and 200 mm) under zero-ambient light (i.e., the only light available is the imaging device's built-in illumination source). The three object distances are the same as in the dynamic range test.

At step 705 the method 700 extracts a 40×40 pixel area from the center of twenty equal sized regions that make up the image. The size and location of the regions are the same as the targets that are used for the dynamic range test at their corresponding object distances.

At step 710 the extracted pixels for each 40×40 area are normalized using the same technique as in the dynamic range test.

At step 715 the method uses the normalized values to calculate the contrast transfer function for each of the twenty regions. In the present system, the contrast transfer function (CTF) is defined as:

$$CTF = \frac{Sum(Max\ Norm) - Sum(Min\ Norm)}{Sum(Max\ Norm) + Sum(Min\ Norm)}$$

Sum(Max Norm) is a summation of the maximum normalized pixel values and Sum(Min Norm) is the summation of the minimum normalized pixel values. Maximum normalized pixel values are those pixels whose values are greater than or equal to a threshold value of 0.50 and minimum normalized pixel values are those pixels whose values are less than 0.50.

At step 720 the contrast transfer function values for each of the 20 regions are compared to the minimum permissible values. In the present system, the permissible minimums are:

| |
| --- |
| CTF > 0.40 @ 200 mm object distance |
| CTF > 0.50 @ 150 mm object distance |
| CTF > 0.60 @ 100 mm object distance |

Those skilled in the art will appreciate that the processes used to evaluate the horizontal and vertical targets are slightly different for a CCD camera with non-square pixels. In the preferred system, the target's black and white bars have equal widths, which correspond to the minimum feature size the imaging system is expected to resolve. For CCD cameras with non-square pixels, the features of the targets will scale accordingly, and are designed to match the pixel geometry.

At step 725 the method 700 causes the computer to print the results of the contrast resolution test. In the preferred system, the printed information includes the CTF values for each region.

At step 730 the method 700 determines whether additional target images need to be evaluated under the contrast resolution test. As mentioned above, six images are used in the preferred system. Therefore, the method will return to step 705 and evaluate the next image until all six images have been processed. At that point, the method 700 terminates and returns to the method 500.

FIG. 8 is a flow diagram illustrating the method 800 for evaluating the distortion of the imaging device under test. In the preferred system, the user digitizes and stores two (2) images prior to initiating the distortion test. These images correspond to the two targets (horizontal and vertical; FIGS. 3 and 4, respectively) at one object distance (150 mm) under zero-ambient light. The two digitized images previously used for the contrast resolution test at the 150 mm object distance may be used in lieu of grabbing new images.

At step 805 the method 800 extracts a 20×20 pixel area from the center of twenty-five equal sized regions that make up the image (a 5×5 array).

At step 810 the 400 pixels for each region are normalized using the same technique used in the dynamic range test.

Those skilled in the art will appreciate that the processes used to evaluate the horizontal and vertical targets are slightly different when using a CCD camera with non-square pixels. As mentioned above, the target features depend on the geometry of the camera's pixels and the minimum feature size the imaging system is expected to resolve.

At step 815 the method 800 calculates the frequency for each row or column (depending on whether the horizontal or vertical parameters are being evaluated).

When testing the horizontal parameters (using the target of FIG. 3), the average distance between the vertical bars (horizontal frequency) of each of the 25 regions is determined using all 400 normalized pixel values for each region. For each of the 20 rows of pixels in each region, all of the relative minimum values are determined. A relative minimum value is defined as any pixel that has a normalized value such that its right neighbor pixel has a higher normalized value and its left neighbor pixel has a normalized value greater than or equal to it.

The number of relative minimums minus 1 divided by the number of physical pixels between the first and last relative minimums contained in a row is the number of black bars per pixel or horizontal frequency for the row. These values are averaged for all twenty rows to provide a single number for the horizontal frequency of each region. A typical value for horizontal frequency is 0.236 bars/pixel.

When testing the vertical parameters (using the target of FIG. 4), the average distance between the horizontal bars (vertical frequency) for each of the 25 regions is determined using all 400 normalized pixel values for each region. For each of the 20 columns of pixels in each region, all of the relative minimum values are determined. A relative minimum value is defined as any pixel that has a normalized value such that its lower neighbor pixel has a higher normalized value and its upper neighbor pixel has a normalized value greater than or equal to it.

The number of relative minimums minus 1 divided by the number of physical pixels between the first and last relative minimums contained in a column is the number of black bars per pixel or vertical frequency for the column. These values are averaged for all twenty columns to provide a single number for the vertical frequency of each region. A typical value for vertical frequency is 0.238 bars/pixel.

At step 825 the method 800 determines the variation between the frequency (horizontal or vertical, depending on the parameter being evaluated) among all of the 25 regions. The variation is defined as (Max−Min)/(Max+Min).

At step 830 the variation is compared to the established criteria. In the present system, the maximum permissible variation (horizontal or vertical) among all of the 25 regions is 10 percent.

At step 835 the method 800 causes the computer to print the results of the distortion test. In the preferred system, the printed information includes the average frequency for each region.

At step 835 the method 800 determines whether additional target images need to be evaluated under the dynamic range test. As mentioned above, two images are used in the preferred system. Therefore, the method will return to step 805 and evaluate the next image until both images have not already been processed. At that point, the method 800 terminates and returns to the method 500.

The foregoing methods of the present invention may conveniently be implemented in a computer program that is based upon the flow diagrams of FIGS. 5–8. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer or operating system will be aware of program modules and tools that are most useful for that user's needs and purposes.

The present invention has been described in relation to particular embodiments which are intended in all respects to be illustrative rather than restrictive. For example, although the specific parameters described in conjunction with the preferred system are used to qualify electro-optical performance of an imaging device that uses a particular image sensor and lens, the present invention may be applied to test other imaging devices by providing appropriate test fixtures and targets and analyzing corresponding images in accordance with the requirements of the specific system.

Alternative embodiments will become apparent to those skilled in the art to which the present invention pertains without departing from its spirit and scope. Accordingly, the scope of the present invention is defined by the appended claims rather than the foregoing description.

What is claimed is:

1. A system for automatically evaluating performance characteristics of an imaging device, comprising:

a plurality of optical targets, said optical targets including features designed to test said performance characteristics;

a test fixture for mounting said test targets and said imaging device in a predetermined relationship;

a computing device for storing and evaluating test target images captured by said imaging device and corresponding to said plurality of test targets; and an illumination light source for establishing ambient lighting conditions;

wherein said computing device is programmed to:
   retrieve said test target images;
   analyze at least one of said test target images to determine the dynamic range of said imaging device;
   analyze at least one of said test target images to determine the contrast resolution of said imaging device;
   analyze at least one of said test target images to determine the distortion of said imaging device;
   determine, on the basis of said analyses, whether said imaging device is satisfactory; and
   in response to said imaging device being satisfactory, provide an output indicating that said imaging device is satisfactory; otherwise, provide an output indicating that said imaging device is unsatisfactory.

2. A system for automatically evaluating performance characteristics of an imaging device as recited in claim 1, wherein at least one of said test target images includes a two-dimensional array of regions and each of said regions includes a plurality of zones having different gray scale values, and wherein said computing device is programmed to determine the dynamic range of said imaging device by:

identifying a predetermined number of pixels from each of said zones in said at least one test target image;

normalizing, for each of said regions, said identified pixels;

averaging, for each of said zones, said normalized pixels; and comparing, for each of said zones, said average normalized pixel value to predetermined criteria.

3. A system for automatically evaluating performance characteristics of an imaging device as recited in claim 1, wherein at least one of said test target images includes a two dimensional array of regions and each of said regions includes a plurality of zones having different gray scale values, and wherein said computing device is programmed to determine the dynamic range of said imaging device by:

identifying a predetermined number of pixels from each of said zones in said at least one test target image;

normalizing said identified pixels;

averaging, for each of said zones, said normalized pixels; and comparing, for each of said zones, said average normalized pixel value to predetermined criteria.

4. A system for automatically evaluating performance characteristics of an imaging device as recited in claim 1, wherein at least one of said test target images includes bar images, and wherein said computing device is programmed to determine the contrast resolution of said imaging device by:

identifying a predetermined number of pixels in a predetermined number of regions of said at least one test target image;

normalizing, for each of said regions, said identified pixels;

determined a contrast transfer function for each of said regions; and comparing, for each region, said contrast transfer function to predetermined criteria.

5. A system for automatically evaluating performance characteristics of an imaging device as recited in claim 1, wherein at least one of said test target images includes a bar image, and wherein said computing device is programmed to determine the distortion of said imaging device by:

identifying a predetermined number of pixels in a predetermined number of regions of said at least one test target image;

normalizing, for each of said regions, said identified pixels;

determining, for each of said regions, an average frequency;

determining the variation in said average frequencies; and comparing said variation to a predetermined criteria.

6. A system for automatically evaluating performance characteristics of an imaging device as recited in claim 5, wherein said computing device is programmed to determine said average frequency by:

determining, for each row of identified pixels in each of said regions, which of said identified pixels represent local minimums;

determining, for each of said rows, the numbers of bars per pixel; and averaging, for each of said regions, the number of bars per pixel for each row in said region.

7. In a test system including an imaging device and a computer, a method for automatically evaluating said imaging device, comprising the steps of:

capturing a target image corresponding to a test target, said test target including a two-dimensional array of regions, said regions each including a plurality of zones having different gray scale values;

identifying a predetermined number of pixels from each zone in said target image;

normalizing, for each of said regions in said target image, said identified pixels;

averaging, for each of said zones in said target image, said normalized pixels to provide average normalized values; and comparing said average normalized values to predetermined criteria;

determining, based on said comparison, whether said imaging device is satisfactory; and in response to said imaging device being satisfactory, providing an output indicating that said imaging device is satisfactory, otherwise providing an output indicating that said imaging device is unsatisfactory.

8. In a test system including an imaging device and a computer, a method for automatically evaluating said imaging device, comprising the steps of:

capturing a target image corresponding to a test target, said test target including a two-dimensional array of regions, said regions each including a plurality of zones having different gray scale values;

identifying a predetermined number of pixels from each zone in said target image;

normalizing said identified pixels;

averaging, for each of said zones in said target image, said normalized pixels to provide average normalized values; and comparing, for each of said zones in said target image, said average normalized pixel value to corresponding zones in neighboring regions;

determining, based on said comparison, whether said imaging device is satisfactory; and in response to said imaging device being satisfactory, providing an output indicating that said imaging device is satisfactory, otherwise providing an output indicating that said imaging device is unsatisfactory.

9. In a test system including an imaging device and a computer, a method for automatically evaluating said imaging device, comprising the steps of:

capturing a target image corresponding to a test target, said test target including a plurality of parallel bars;

identifying a predetermined number of pixels in a predetermined number of regions of said target image;

normalizing, for each of said regions in said target image; said identified pixels;

determining a contrast transfer function for each of said regions; and comparing, for each region in said target image, said contrast transfer function to predetermined criteria;

determining, based on said comparison, whether said imaging device is satisfactory; and in response to said imaging device being satisfactory, providing an output indicating that said imaging device is satisfactory, otherwise providing an output indicating that said imaging device is unsatisfactory.

10. In a test system including an imaging device and a computer, a method for automatically evaluating said imaging device, comprising the steps of:

capturing a target image corresponding to a test target, said test target including a plurality of parallel bars;

identifying a predetermined number of pixels in a predetermined number of regions said target image;

normalizing, for each of said regions in said target image, said identified pixels;

determining, for each of said regions in said target image, an average frequency;

determining the variation in said average frequencies; and comparing said variation to a predetermined criteria;

determining, based on said comparison, whether said imaging device is satisfactory; and in response to said imaging device being satisfactory, providing an output indicating that said imaging device is satisfactory, otherwise providing an output indicating that said imaging device is unsatisfactory.

11. In a test system including an imaging device and a computer, a method for automatically evaluating said imaging device as recited in claim 5, wherein determining an average frequency comprises the steps of:

determining, for each row of identified pixels in each of said regions, which of said identified pixels represent local minimums;

determining, for each of said rows, the numbers of bars per pixel; and averaging, for each of said regions, the number of bars per pixel for each row in said region.

* * * * *